United States Patent [19]

Hattori et al.

[11] Patent Number: 4,495,962
[45] Date of Patent: Jan. 29, 1985

[54] FLUID CONTROL VALVE

[75] Inventors: Noboru Hattori, Yokosuka; Yoshitomo Suzuki, Yokohama, both of Japan

[73] Assignee: Nissan Motor Company, Limited, Yokohama, Japan

[21] Appl. No.: 458,328

[22] Filed: Jan. 17, 1983

[30] Foreign Application Priority Data

Mar. 23, 1982 [JP] Japan .................. 57-46118

[51] Int. Cl.³ .......................... G05D 11/03
[52] U.S. Cl. ................................. 137/117
[58] Field of Search ......................... 137/117

[56] References Cited

U.S. PATENT DOCUMENTS

| 3,028,876 | 4/1962 | Gratzmuller | 137/501 |
| 3,618,628 | 11/1971 | Kramer | 137/117 X |
| 4,244,389 | 1/1981 | Shimoura | 137/117 |
| 4,343,324 | 8/1982 | Ohe | 137/117 |

Primary Examiner—Robert G. Nilson
Attorney, Agent, or Firm—Lane, Aitken & Kananen

[57] ABSTRACT

A fluid control valve assembly for use in a hydraulic system, comprises: a valve body having a valve cavity extending axially thereof and fluid inlet and outlet ports communicating respectively with discharge and suction ports of a fluid feed pump; a valve spool received in the valve cavity and having at least one annular groove formed therein, the valve body and the valve spool defining in combination high-pressure and low-pressure chambers in the valve cavity. The valve body further has a discharge passageway held in communication with the high-pressure chamber through an orifice passageway, a first control passageway having an upstream end open to the high-pressure chamber and a downstream end communicating with the annular groove in the valve spool, a second control passageway having an upstream end and a downstream end open to the discharge passageway, and a third control passageway having one end held in communication with the upstream end of the second control passageway and the other end open to the low-pressure chamber; wherein the valve body is formed with a flow restriction passageway having one end held in communication with the upstream end of the second control passageway and the other end communicating with the annular groove of the valve spool and restricted or closed by the valve spool when the valve spool is axially moved away from the high-pressure chamber.

4 Claims, 4 Drawing Figures

FLUID CONTROL VALVE

FIELD OF THE INVENTION

The present invention relates to a fluid control valve assembly for use in a hydraulic system, and more particularly to an improved fluid control valve assembly for use with a fluid feed pump of the revolution-responsive type, particularly pumps of that type which are employed in a power-assisted steering mechanism of an automotive vehicle.

SUMMARY OF THE INVENTION

In accordance with the present invention, there is provided a fluid control valve assembly for use in a hydraulic system, the fluid control valve assembly being provided between the hydraulic system and a fluid feed pump having suction and discharge ports, comprising: a valve body having a valve cavity extending axially between the suction and discharge ports, and fluid inlet and outlet ports communicating respectively with the discharge and suction ports of the fluid feed pump; a valve spool received in the valve cavity and having at least one annular groove formed therein, the valve body and the valve spool together defining high-pressure and low-pressure chambers in the valve cavity that are axially spaced apart from each other across the valve spool, the high-pressure chamber being held in communication with the fluid inlet port, the valve spool being axially movable between a first axial position where the valve spool closes the fluid outlet port to block communication between the fluid inlet and outlet ports and a second axial position where the valve spool opens the fluid outlet port to provide communication between the fluid inlet and outlet ports; biasing means for biasing the valve spool toward the high-pressure chamber; and stop means for stopping the valve spool against the biasing force of the biasing means and having the valve spool held at the first axial position; the valve body further having a discharge passageway held in communication with the high-pressure chamber through an orifice passageway, a first control passageway having an upstream end open to the high-pressure chamber and a downstream end communicating with the annular groove of the valve spool, a second control passageway having an upstream end and a downstream end open to the discharge passageway, and a third control passageway having one end held in communication with the upstream end of the second control passageway and the other end open to the low-pressure chamber; wherein the valve body is formed with a flow restriction having one end held in communication with the upstream end of the second control passageway and the other end communicating with the annular groove of the valve spool when the valve spool is held at the first axial position thereof.

BRIEF DESCRIPTION OF THE DRAWING

The drawbacks of a prior-art fluid control valve assembly and the features and advantages of a fluid control valve assembly according to the present invention will be more clearly understood from the following description taken in conjunction with the accompanying drawings in which.

DESCRIPTION OF THE PRIOR ART

A fluid feed pump of the revolution-responsive type employed in a power-assisted steering mechanism of an automotive vehicle is so designed that the fluid delivered from the fluid feed pump is in part returned to the suction port of the fluid feed pump by means of a fluid control valve assembly to reduce the fluid pressure provided by the fluid feed pump when the pump is driven at high speeds by the vehicle's engine and enhance the operational stability of the power-assisted steering mechanism of the vehicle during high-speed cruising.

Figure 1:
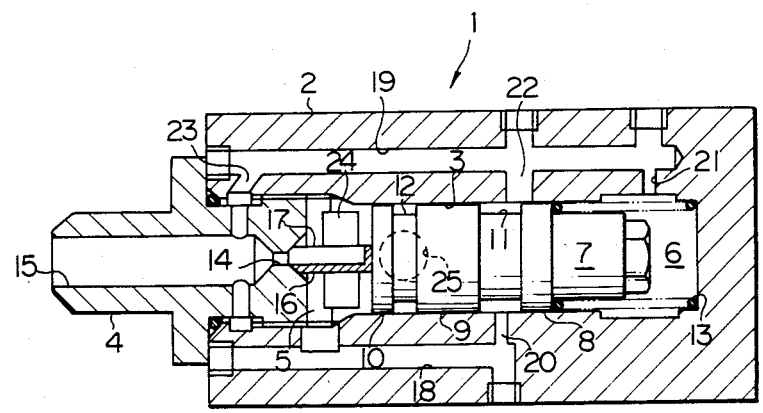
FIG. 1 is a cross sectional view showing the structure of a prior-art fluid control valve assembly.

Referring first to FIG. 1 of the drawings, there is shown a representative prior-art fluid control valve assembly. The fluid control valve assembly herein shown comprises a control valve body 1 having a main valve body member 2 formed with a valve cavity 3 extending axially of the main valve body member 2 and an auxiliary valve body member 4 screwed to the main valve body member 2 to close the valve cavity 3. The valve cavity 3 is divided into two chambers, i.e., high-pressure and low-pressure chambers 5 and 6, respectively, by means of a valve spool 7 which is axially slidably received in the valve cavity 3. The valve spool 7 has first, second and third land portions 8, 9 and 10 which are axially spaced apart from one another so as to form first and second annular grooves 11 and 12 respectively between the first and second land portions 8 and 9 and between the second and third land portions 9 and 10. A preloaded helical compression spring 13 extends axially between the first land portion 8 of the valve spool 7 and the bottom wall surface of the valve cavity 3 so as to bias the valve spool 7 toward the high-pressure chamber 5. The auxiliary valve body member 4 of the control valve body 1 has formed therein an orifice passageway 14 held in communication with the high-pressure chamber 5. The auxiliary valve body member 4 has further formed therein a discharge passageway 15 to be connected to a hydraulic system such as for example a power-assisted mechanism not shown and held in communication with the high-pressure chamber 5 through the orifice passageway 14. The valve spool 7 has further an axial projection 16 extending axially therefrom toward the orifice passageway 14 and having a longitudinal groove 17 formed therein so as to provide constant communication between the high-pressure chamber 5 and the orifice passageway 14. The main valve body member 2 of the control valve body 1 is further formed with upstream and downstream fluid passageways 18 and 19 in parallel relationship to the center axis of the valve spool 7. The upstream fluid passageway 18 has one end open to the high-pressure chamber 5 and the other end held in communication with a flow restriction passageway 20. The flow restriction passageway 20 is positioned so as to be closed, opened or restricted by the second land portion 9 of the valve spool 7 depending upon an axial position of the valve spool 7. The downstream fluid passageway 19, on the other hand, has one end held in communication with the low-pressure chamber 6 through an aperture 21, an intermediate portion held in communication with the first annular groove 11 of the valve spool 7 through a connecting passageway 22 and the other end held in communication with the discharge passageway 15 through a connecting passagway 23. The connecting passageway 22 is larger in cross-section than the flow restriction passageway 20. The main valve body member 2 is formed with fluid inlet and outlet ports 24 and 25 communicating respectively with discharge and suction ports of the fluid feed pump not shown. When the flow restriction passageway 20 is initiated to be restricted by the second land portion 9 of the valve spool 7, the outlet port 25 is designed to communicate with the inlet port 24 so that excess fluid delivered from the discharge port of the fluid feed pump can flow back to the suction port thereof without circulating in the fluid control valve assembly.

Figure 2:
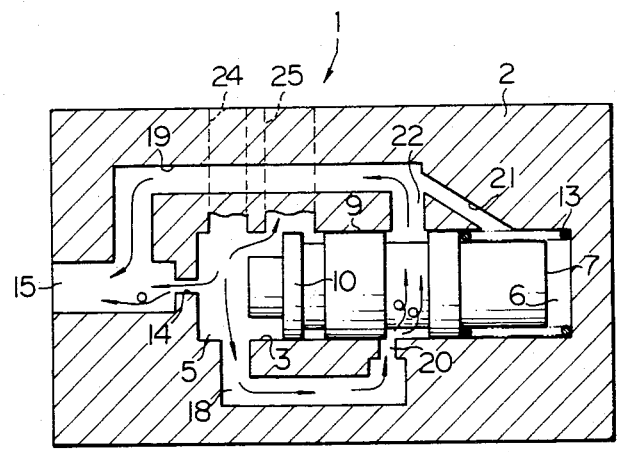
FIG. 2 is a view similar to FIG. 1 but showing the flow circulation of the fluid passing through the prior-art fluid control valve assembly.

In the prior-art fluid control valve assembly 1, fluid under pressure from the discharge port of the fluid feed pump enters the high-pressure chamber 5 in the valve cavity 3 through the fluid inlet port 24 with the fluid outlet port 25 closed by the third land portion 10 of the valve spool 7. At this time, the fluid under pressure in part flows directly to the discharge passageway 15 through the orifice passageway 14 while the fluid under pressure in part flows back to the discharge passageway 15 by way of the upstream fluid passageway 18, the flow restriction passageway 20, the first annular groove 11, the fluid connecting passageway 22, the downstream fluid passageway 19, and the fluid connecting passageway 23. The fluid is simultaneously directed to the low-pressure chamber 14 through the downstream fluid passageway 19 and the aperture 21. As a consequence, fluid pressure developed in the low pressure-chamber 6 becomes less than fluid pressure developed in the high-pressure chamber 5 under the influence of the flow resistance of the flow restriction passageway 20 and the aperture 21. As the number of revolutions of the output shaft of the engine is progressively increased, the amount of the fluid admitted into the high-pressure chamber 5 through the fluid inlet port 24 is proportionally increased so that a large differential fluid pressure is developed between the upstream side of the flow restriction passageway 20, viz., the high-pressure chamber 5 and the downstream side of the flow restriction passageway 20, viz., the low-pressure chamber 6. When the axial force resulting from the large differential fluid pressure developed between the high-pressure and low-pressure chambers 5 and 6 is greater than the spring force of the preloaded helical compression spring 13, the valve spool 7 is caused to move axially toward the low-pressure chamber 6 so that the flow restriction passageway 20 is restricted or closed by the second land portion 9 of the valve spool 7, and the communication of the fluid outlet port 25 with the fluid inlet port 24 is simultaneously established or increased. This results in excess fluid being delivered from the fluid feed pump as a consequence of the increase of the number of revolutions of the output shaft of the engine being returned to the suction port of the fluid feed pump without circulating in the fluid control assembly. One problem encountered in the prior-art fluid control valve assembly of this nature, however, is that fluid passing through the flow restriction passageway 20 causes a turbulent flow around the first annular groove 11 of the valve spool 7 as shown in FIG. 2 and the turbulent flow results in an unevenness in the fluid pressure which gives rise to vibrations of the valve spool 7 in the valve cavity 3. Another problem encountered is that the vibrations of the valve spool 7 in turn disturb the flow of the fluid passed through the flow restriction passageway 20 and thus results in self-excited vibrations, causing pressure fluctuation in the fluid discharged from the discharge passageway 15 which produces unpleasant noises.

The present invention contemplates provision of an improved fluid control valve assembly overcoming the above described problems that have thus far been inherent in the prior-art fluid control valve assembly.

It is accordingly an object of the present invention to prevent the vibrations of the valve spool in the control valve assembly.

It is another object of the present invention to reduce the pressure fluctuation in the fluid discharged from the control valve assembly.

It is another object of the present invention to prevent occurrence of unpleasant noises caused by the pressure fluctuation in the fluid discharged from the control valve assembly.

DESCRIPTION OF THE PREFERRED EMBODIMENT

Figure 3:
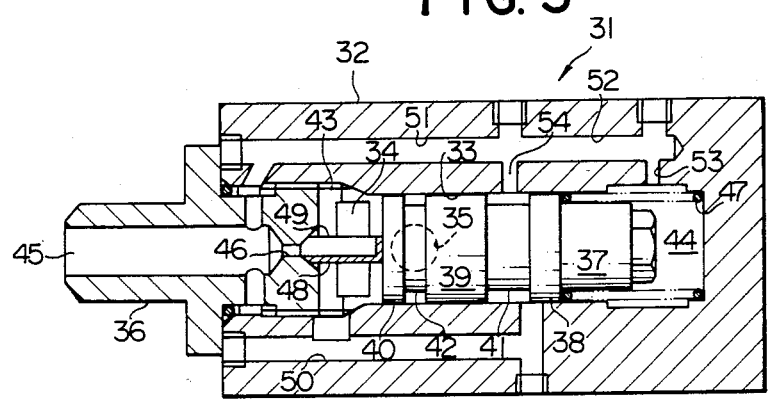
FIG. 3 is a cross sectional view showing the structure of a fluid control valve assembly according to the present invention.

Referring first to FIG. 3 of the drawings, a fluid control valve assembly embodying the present invention is shown comprising a valve body 31 which comprises a main valve body member 32 having a valve cavity 33 extending axially thereof and fluid inlet and outlet ports 34 and 35 communicating respectively with discharge and suction ports of a fluid feed pump, not shown, that is generally belt driven by the engine of an automobile vehicle, and an auxiliary valve body member 36 screwed to the main valve body member 32 to close the valve cavity 33.

The fluid control valve assembly according to the present invention further comprises a valve spool 37 slidably received in the valve cavity 33 and having first to third land portions 38 to 40 which are axially spaced apart from one another so as to form first and second annular grooves 41 and 42 respectively, between the first and second land portions 38 and 39 and between the second and third land portions 39 and 40. The main and auxiliary valve body members 32 and 36 of the valve body 31 and the valve spool 37 in combination define the valve cavity 33 high-pressure and low-pressure chambers 43 and 44 axially spaced apart from each other across the valve spool 37 with the high-pressure chamber 43 held in communication with the fluid inlet port 34. The auxiliary valve body member 36 is formed with a discharge passageway 45 adapted to be connected to a hydraulic system such as for example a power-assisted steering support mechanism (not shown) and an orifice passageway 46 between the discharge passageway 45 and the high-pressure chamber 43. The discharge passageway 45 is thus held in communication with the high-pressure chamber 43 through the orifice passageway 46. The valve spool 37 is adapted to axially be movable between a first axial position where the third land portion 40 of the valve spool 37 closes the fluid outlet port 35 to block communication between the fluid inlet and outlet ports 34 and 35 and a second axial position where the third land portion 40 of the valve spool 37 opens the fluid outlet port 35 to provide communication between the fluid inlet and outlet ports 34 and 35.

The fluid control valve assembly according to the present invention further comprises biasing means constituted by a preloaded helical compression spring 47 extending axially in the low-pressure chamber 44 between the bottom wall surface of the valve cavity 33 and the first land portion 38 of the valve spool 37 to bias the valve spool 37 toward the high-pressure chamber 43. The fluid control valve assembly further comprises stop means comprising an axial projection 48 axially extending from the valve spool 37 toward the orifice passageway 46 and having formed therein a longitudinal groove 49 providing constant communication between the high-pressure chamber 43 and the orifice passageway 46. The axial projection 48 thus serves to stop and hold the valve spool 37 against the biasing force of the helical compression spring 47 at the first axial position where the third land portions 40 of the valve spool 37 closes the fluid outlet port 35.

The main valve body member 32 of the valve body 31 is further formed with first to third fluid control passageways 50 to 52 each of which extends substantially in parallel relationship to the valve cavity 33. The first fluid control passageway 50 has an upstream end open to the high-pressure chamber 43 and a downstream end communicating with the first annular groove 41 of the valve spool 37. The second fluid control passageway 51 has a downstream end open to the discharge passageway 45 and an upstream end held in communication with one end of third fluid control passageway 52 having the other end open to the low-pressure chamber 44 through an aperture 53. The main valve body member 32 of the valve body 31 is formed with a flow restriction passageway 54 having one end held in communication with the upstream end of the second fluid control passageway 51 and the other end communicating with the first annular groove 41 of the valve spool 37 when the valve spool 37 is held at the first axial position thereof. The flow restriction passageway 54 is restricted or closed by the second land portion 39 of the valve spool 37 when the valve spool 37 is axially moved toward the second axial position against the preloaded helical compression spring 47. The flow restriction passageway 54 is smaller in cross-section than the upstream end of the second fluid control passageway 51.

Description will be now provided regarding the operation of the fluid control valve assembly constructed in accordance with the present invention as described hereinbefore.

In operation, the fluid under pressure from the fluid feed pump enters the high-pressure chamber 43 through the fluid inlet port 34 while the fluid outlet port 35 is closed by the third land portion 40 of the valve spool 37. Part of the fluid under pressure flows to the discharge passageway 45 through the orifice passageway 46 whilst the rest of the fluid returns to the discharge passageway 45 by way of the first fluid control passageway 50, the first annular groove 41, the flow restriction passageway 54, and the second fluid control passageway 51. The fluid is simultaneously directed to the low pressure chamber 44 through the third fluid control passageway 52 and the aperture 53. As a consequence, fluid pressure developed in the low-pressure chamber 44 becomes less than fluid pressure developed in the high-pressure chamber 43 under the influence of the flow resistance of the flow restriction passageway 54 and the aperture 53. As the number of revolutions of the output shaft of the engine is progressively increased, the amount of the fluid admitted into the high-pressure chamber 43 through the fluid inlet port 34 is proportionally increased so that a large differential fluid pressure is developed between the upstream side of the flow restriction passageway 54, viz., the high-pressure chamber 43 and the downstream side of the flow restriction passageway 54, viz., the low-pressure chamber 44. When the axial force resulting from the large differential fluid pressure developed between the high-pressure and low-pressure chambers 38 and 44 is greater than the spring force of the preloaded helical compression spring 47, the valve spool 37 is caused to move axially toward the low-pressure chamber 44 to assume the second axial position thereof so that the flow through the flow restriction passageway 54 is restricted or stopped by the second land portion 39 of the valve spool 37. The valve spool 37 simultaneously establishes communication of the outlet port 35 with the fluid inlet port 34. This results in excess fluid being delivered from the fluid feed pump as a result of an increase of the number of revolutions of output shaft of the engine being returned to the suction port of the fluid feed pump.

Figure 4:
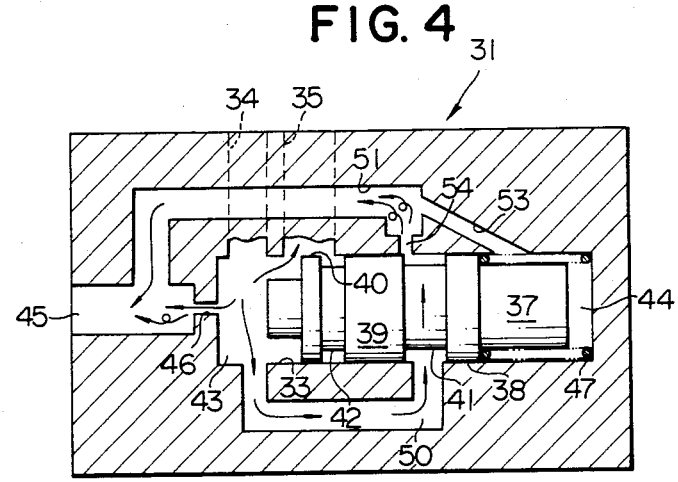
FIG. 4 is a view similar to FIG. 3 but showing the flow circulation of the fluid passing through the fluid control valve assembly according to the present invention.

Referring to FIG. 4, the fluid passed through the flow restriction passageway 54 causes a turbulent flow under the influence of the flow resistance of the flow restriction passageway 54. The turbulent flow however does not cause the vibrations of the valve spool 37 inevitably inherent in the prior-art fluid control valve assembly because of the fact that the turbulent flow does not occur in the first annular groove 41 of the valve spool 37 but downstream of the valve spool 37 after passing through the flow restriction passageway 54.

As will have been appreciated from the foregoing description, the fluid control valve assembly proposed in accordance with the present invention is characterized by a main valve body member 32 of the valve body 31 that is formed with a flow restriction passageway 54 having one end held in communication with the upstream end of the second fluid control passageway 51 and the other end communicating with the first annular groove 41 of the valve spool 37 when the valve spool 37 is held at the first axial position thereof. In other words, the flow restriction passageway is thus interposed between the first annular groove of the valve cavity and the second fluid control passageway so that the fluid control valve assembly can prevent both the vibration of the valve spool caused by the differential pressure acting on the valve spool and self-excited vibration by the valve spool which are inevitably inherent in the prior-art fluid control valve assembly, and the occurrence of unpleasant noises caused by vibrations of the valve spool. The fluid control valve assembly improves the stability of the flow of the fluid discharged from the fluid fluid control valve assembly in that the vibrations of the valve spool and the self-excited vibration by the valve spool are completely eliminated.

What is claimed is:

1. A fluid control valve assembly for use in a hydraulic system, the fluid control valve assembly being provided between the hydraulic system and a fluid feed pump having suction and discharge ports, comprising:
a valve body having a valve cavity extending axially thereof and fluid inlet and outlet ports communicating respectively with said discharge and suction ports of said fluid feed pump;
a valve spool received in said valve cavity and having at least one annular groove formed therein, said valve body and the valve spool defining in combination in the valve cavity high-pressure and low-pressure chambers axially spaced apart from each other across the valve spool, said high-pressure chamber being held in communication with said fluid inlet port, said valve spool being axially movable between a first axial position where said valve spool closes said fluid outlet port to block communication between said fluid inlet and outlet ports and a second axial position where said valve spool opens said fluid outlet port to provide communication between said fluid inlet and outlet ports;

biasing means for biasing said valve spool toward said high-pressure chamber; and stop means for stopping said valve spool against the biasing force of said biasing means and having said valve spool held at the first axial position;

said valve body further having a discharge passageway held in communication with said high-pressure chamber through an orifice passageway, a first fluid control passageway having an upstream end open to said high-pressure chamber and a downstream end open to said annular groove of said valve spool, a second fluid control passageway having an upstream end and a downstream end open to said discharge passageway, and a third fluid control passageway having one end held in communication with the upstream end of said second fluid control passageway and the other end open to said low-pressure chamber;

wherein said valve body is formed with a flow restriction passageway having one end held in communication with the upstream end of said second fluid control passageway and the other end communicating with said annular groove of said valve spool when the valve spool is held at the first axial position thereof.

2. A fluid control valve assembly as set forth in claim 1, in which said stopping means is constituted by an axial projection axially extending from the valve spool toward said orifice passageway and having formed therein a longitudinal groove providing communication between said high-pressure chamber and said orifice passageway.

3. A fluid control valve assembly as set forth in claim 1, in which said biasing means is constituted by a preloaded helical compression spring extending axially in said low-pressure chamber between the bottom wall surface of said valve cavity and said valve spool to bias said valve spool toward said high-pressure chamber.

4. A fluid control valve assembly for use in a hydraulic system, the fluid control valve assembly being provided between the hydraulic system and a fluid feed pump having suction and discharge ports, comprising:

a valve body having a valve cavity extending axially thereof and fluid inlet and outlet ports communicating respectively with said discharge and suction ports of said fluid feed pump;

a valve spool received in said valve cavity and having at least one annular groove formed therein, said valve body and the valve spool defining in combination in the valve cavity high-pressure and low-pressure chambers axially spaced apart from each other across the valve spool, said high-pressure chamber being held in communication with said fluid inlet port, said valve spool being axially movable between a first axial position where said valve spool closes said fluid outlet port to block communication between said fluid inlet and outlet ports and a second axial position where said valve spool opens said fluid outlet port to provide communication between said fluid inlet and outlet ports;

biasing means for biasing said valve spool toward said high-pressure chamber; and stop means for stopping said valve spool against the biasing force of said biasing means and having said valve spool held at the first axial position;

said valve body further having a discharge passageway held in communication with said high-pressure chamber through an orifice passageway, a first fluid control passageway having an upstream end open to said high-pressure chamber and a downstream end open to said annular groove of said valve spool, a second fluid control passageway having an upstream end and a downstream end open to said discharge passageway, and a third fluid control passageway having one end held in communication with the upstream end of said second fluid control passageway and the other end open to said low-pressure chamber;

wherein said valve body is formed with a variable flow restriction passageway having one end held in communication with the upstream end of said second fluid control passageway and the other end communicating with said annular groove of said valve spool when said valve spool is held at said first axial position thereof, said variable flow restriction passageway being variable in response to the axial movement of said valve spool, said variable flow restriction passageway and said orifice passageway open to said discharge passageway being arranged in a common plane.

* * * * *